United States Patent [19]

Dykstra et al.

[11] 4,325,027
[45] Apr. 13, 1982

[54] METAL DETECTOR FOR LOCATING OBJECTS WITH FULL SENSITIVITY IN THE PRESENCE OF DISTRIBUTED MINERAL MATERIAL

[75] Inventors: Donald W. Dykstra; Samuel E. Calvin, both of Forest Grove, Oreg.

[73] Assignee: Compass Electronics, Forest Grove, Oreg.

[21] Appl. No.: 98,233

[22] Filed: Nov. 28, 1979

[51] Int. Cl.³ .................... G01V 3/11; G01V 3/165
[52] U.S. Cl. .................................................. 324/329
[58] Field of Search ............... 324/326, 329, 334, 233, 324/239

[56] References Cited

U.S. PATENT DOCUMENTS

| | | | |
|---|---|---|---|
| 3,112,443 | 11/1963 | Buckner | 324/339 |
| 3,337,796 | 8/1969 | Hentschel et al. | 324/233 |
| 3,676,772 | 7/1972 | Lee | 324/233 |
| 3,707,672 | 12/1972 | Miller et al. | 324/239 |
| 3,826,973 | 7/1974 | Pflaum | 324/329 |
| 3,872,380 | 3/1975 | Gardiner | 324/329 |
| 4,024,468 | 5/1977 | Hirschi | 324/329 |
| 4,030,026 | 6/1977 | Payne | 324/329 |
| 4,096,432 | 6/1978 | Spencer | 324/329 |
| 4,128,803 | 12/1978 | Payne | 324/329 |
| 4,213,093 | 7/1980 | Pecori | 324/329 |

Primary Examiner—Gerard R. Strecker
Attorney, Agent, or Firm—Chernoff & Vilhauer

[57] ABSTRACT

An apparatus for detecting metallic objects of a predetermined type buried in the ground and distinguishing such predetermined objects from distributed mineral material and undesired objects. An oscillator produces a transmit signal which causes a transmit coil to generate a varying magnetic field. A receive coil coupled with the transmit coil produces a receive signal induced by the transmit signal and having components thereof corresponding to field-distorting materials in proximity to the coil. A multiple sampling circuit produces samples of the receive signal at selected times having predetermined relationships with typical characteristics receive signal components. The samples are analyzed to produce a sense signal representative of the proximity of a metallic object, and a discriminate signal representative of the type of metallic object as well as its proximity. A sense signal produces aural and visual outputs under the control of the discriminate signal, which cuts off the sense signal in the presence of an undesired metallic object absent the presence of a target object, and adds to the sense signal in the presence of a target object. The apparatus tracks the amplitude of any component of the receive signal attributable to distributed mineral materials so that such a component may be canceled in the discriminate signal.

10 Claims, 5 Drawing Figures

METAL DETECTOR FOR LOCATING OBJECTS WITH FULL SENSITIVITY IN THE PRESENCE OF DISTRIBUTED MINERAL MATERIAL

BACKGROUND OF THE INVENTION

The present invention is directed to apparatus and systems for detecting metallic objects of a predetermined type buried in the ground, and particularly to metal detector apparatus which distinguish such predetermined objects from distributed mineral material and undesired objects.

In attempting to locate valuable coins and jewelry, and other metallic objects, such as pipes, metal detector apparatus typically utilize an electronic circuit and search coil system which produces a varying magnetic field and an electric "receive" signal induced by that field, and utilizes the aforementioned electric signal to detect distortion in the magnetic field resulting from the presence of various conductive or magnetic materials or objects. Metal detector systems utilizing such a circuit and search coil arrangement are disclosed in Penland U.S. Pat. No. 3,549,985; Penland U.S. Pat. No. 3,471,773; and Wheeler U.S. Pat. 2,451,596. A particularly useful search coil arrangement is also disclosed in the U.S. patent application of Fredrick H. Thompson, Ser. No. 039,175, filed May 15, 1979.

While it is a relatively straightforward matter to detect some distortion in a magnetic field which indicates the presence of such materials or objects, it is important to distinguish desired "target" objects from unwanted objects so that time is not wasted digging for unwanted objects, and there are often undesirable objects or materials in close proximity with a desired target object. Heretofore it has been difficult to distinguish the target object from those undesirable items effectively. For example, distributed mineral material is present in the ground almost everywhere and causes distortion in the magnetic field produced by such a search coil. At the same time, other items such as aluminum container pull tabs and ferrous bottle caps are also distributed in the ground at various locations, typically in areas where people have gathered, which, unfortunately, is also where sought-after valuable items such as coins are found. Accordingly, an effective metal detector should be capable of distinguishing a desirable object, such as a coin, from distributed mineral material and other undesirable objects.

It is well known that different materials distort a magnetic field in different ways which are characteristic of the material. Consequently the electric signal produced by a search coil in response to the proximity of such materials will be comprised of various signal components corresponding to the various field-distorting objects in close proximity to the coil, each of those components having a generally distinct and characteristic phase relationship with the magnetic field initially generated by the search coil. Such phase relationships can be empirically determined and utilized to identify different items in the proximity of the search coil from one another. For example, systems capable of identifying materials by their phase characteristics are disclosed in Hentschel et al U.S. Pat. No. 3,337,796, which displays relative phase shifts for different materials, Bukner, Jr. U.S. Pat. No. 3,112,443, which discloses an apparatus for recording phase characteristics of different materials, Gardiner U.S. Pat. No. 3,872,380, which discloses apparatus for distinguishing metals based upon their phase characteristics, and Miller et al U.S. Pat No. 3,707,672 and Barringer U.S. Pat. No. 3,105,934, both of which disclose apparatus which analyze the transient response of a signal to identify different materials and objects.

However, it is a more difficult problem to discriminate between various items simultaneously present, particularly desirable target objects, distributed mineral material, and unwanted objects.

One approach for utilizing the difference in phase characteristics produced by various materials simultaneously present to discriminate between them is to sample the receive signal at known times with respect to the transmit signal and analyze the sample signals, the sampling time having a predetermined relationship with the characteristic phase of particular items. An apparatus utilizing this approach has been disclosed in Payne U.S. Pat. No. 4,030,026. The apparatus disclosed in Payne samples the input signal at a time so that the sampled signal excludes any portion due to the reactive component of that signal, thereby distinguishing distortions in the magnetic field due to soil conditions such as distributed mineral material on the one hand, and target items on the other. However, the aforementioned Payne apparatus discriminates only between two predetermined types of materials.

Another approach is disclosed by Payne U.S. Pat. No. 4,128,803. The apparatus disclosed in this patent utilizes not only the characteristic phase differences between items in the ground, but also the characteristic frequency spectrum difference in the electric signal produced by the search coil through motion of the search coil with respect to the objects in the ground. A pair of synchronous demodulators and corresponding low pass filters for the resistive and reactive components of the receive signal, respectively, each eliminate that portion of the signal attributable to distributed mineral materials because of the difference in frequency spectrum, and the outputs of those respective two circuits are utilized to distinguish between a target object and an unwanted object due to the phase difference therebetween. However, such an apparatus requires continuous movement of the search coil relative to the search area, thus inhibiting exact location of target objects.

In general, it is known that one can discriminate between items in the proximity of a metal detector search coil by sampling the receive signal at predetermined times when components of that signal attributable to particular materials are at zero amplitude, and comparing those samples. Heretofore, however, such an approach has resulted in substantially reduced sensitivity due to proximity of the phase between desired and unwanted objects.

Accordingly, it can be seen that there is a need for an improved metal detector system which minimizes interference from soil conditions, that is, mineral materials distributed in the ground, without requiring constant and consistant movement of the search head, permits discrimination between various metallic objects simultaneously in the proximity of the search coil, and minimizes any loss of sensitivity in such discrimination.

SUMMARY OF THE INVENTION

The present invention overcomes the drawbacks of the aforementioned and other metal detector systems and meets the need for an improved metal detector system by providing, in conjunction with a search coil head, circuitry which takes multiple samples of the receive signal to distinguish various components of the receive signal, tracks the amplitude of the receive signal until a metallic object comes within its proximity to minimize the effect of changing distributed ground minerals, utilizes dual signal paths to maximize sensitivity, and incorporates an absolute value amplifier responsive to the presence of a metal object in one sampled signal path to ensure that a desired target object may be distinguished in the presence of localized mineral irregularities.

A periodic signal-generating circuit generates a transmit signal which causes a transmit coil to produce a varying magnetic field. A receive coil is coupled to the transmit coil, which is adjusted to minimize the electrical signal induced in the receive coil absent the proximity of a field-distorting material. In the presence of a field-distorting material a receive signal is generated having distinct components attributable to whatever types of field-distorting material are proximate the coils.

The multiple sampling circuit samples the receive signal at three different times. One sample is taken approximately when the component of the receive signal attributable to a target object, represented by a coin, is zero or a small value and the phase angle of the component represented by distributed mineral material is in the fourth quadrant of a phasor representation. Another sample is taken at a time period after the phase angle of the mineral component has crossed from the fourth to the first quadrant and equal in time to the period before that crossover that the first sample is taken. A third sample is taken when the component attributable to a particularly undesirable and difficult to distinguish item, represented by an aluminum pull tab, is zero. These samples are thereafter analyzed to discriminate between a target object on the one hand, and distributed minerals as well as other undesirable objects on the other.

A dual signal path system is utilized wherein the first two aforementioned samples are added to cancel the mineral component while producing a signal for all metallic items, amplifying that signal in a "sense" signal path and utilizing the amplified sense signal, primarily, to produce the detector output. A second, "discriminate" path utilizes the first and third samples, along with the amplified sense signal, to distinguish between a target object on the one hand, and mineralization or reject objects on the other, and thereby produce a discriminate signal which inhibits the sense signal from producing detector output in the presence of a reject object absent the presence of a target object. This arrangement thus minimizes the sensitivity loss of the detector due to discrimination between field-distorting materials.

In the discriminate path a tracking circuit is included which maintains the discriminate output at zero despite the presence of mineral material until a metallic object is proximate the search coils. Thus, unwanted responsiveness of the detector to mineralization is also eliminated. The discriminate path further includes an absolute value amplifier circuit which ensures that a positive signal will be produced for a desired target object despite changes in the mineralization level after a metallic object has been detected.

In addition, the invention provides for the adjustment of the metal detector apparatus for different mineralization characteristics and to detect various types of metallic objects.

Accordingly, it is a principal objective of the present invention to provide a new and improved metal detector apparatus.

It is another principal objective of the invention to provide such a metal detector apparatus which discriminates specific target objects from distributed mineral material.

It is a further principal objective of the afore-mentioned apparatus to distinguish target objects from other unwanted objects, as well as distributed mineral material.

It is a further objective of the present invention to provide such an apparatus with minimal loss of sensitivity resulting from object discrimination.

It is yet another objective of the present invention to prevent false indications of the presence or absence of a target object.

The foregoing and other objectives, features and advantages of the invention will be more readily understood upon consideration of the following detailed description of the invention, taken in conjunction with the accompanying drawings.

DETAILED DESCRIPTION OF THE INVENTION

Figure 1:
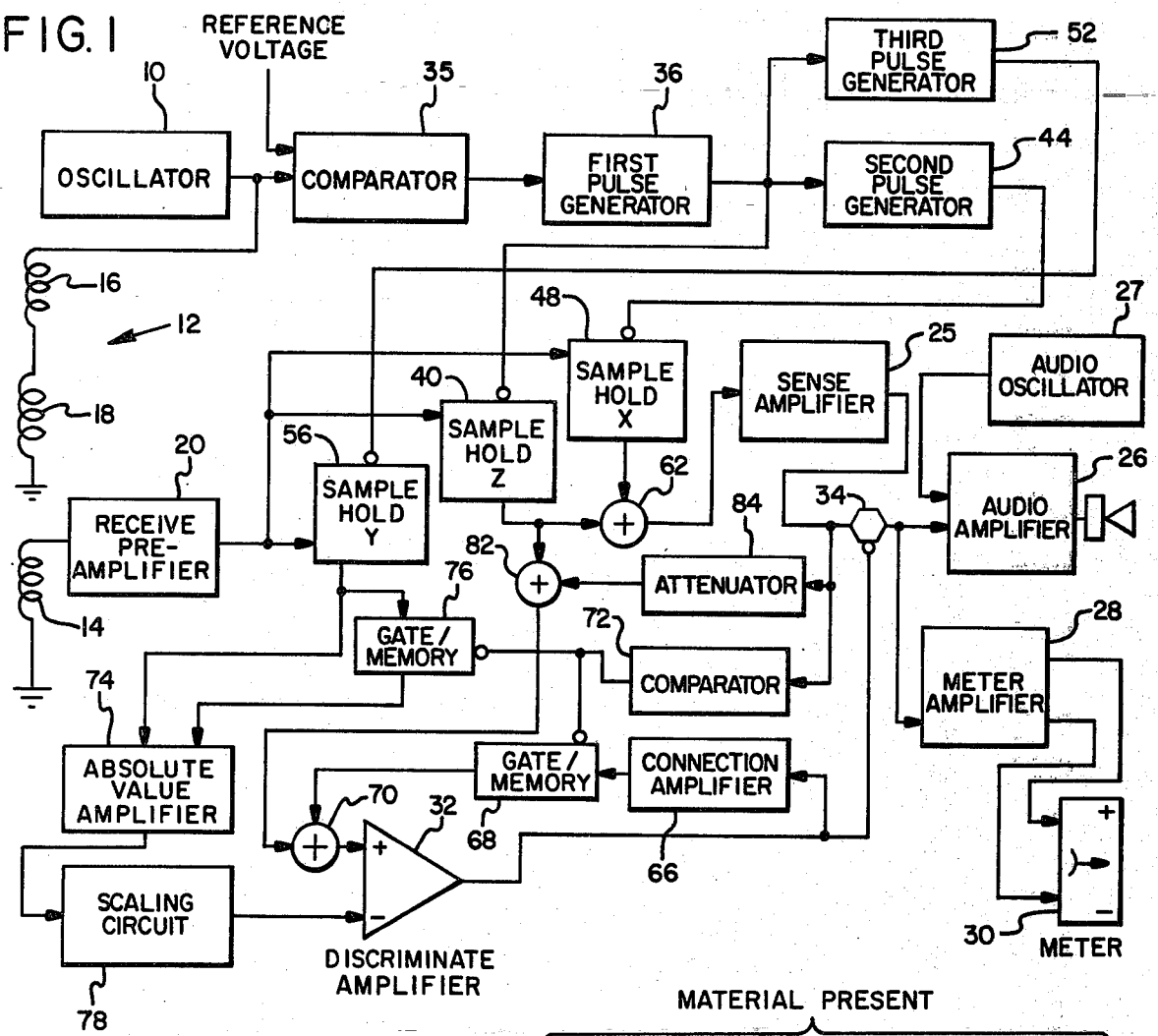
FIG. 1 is a block diagram of an exemplary apparatus embodying the principles of the present invention.
Figure 2:
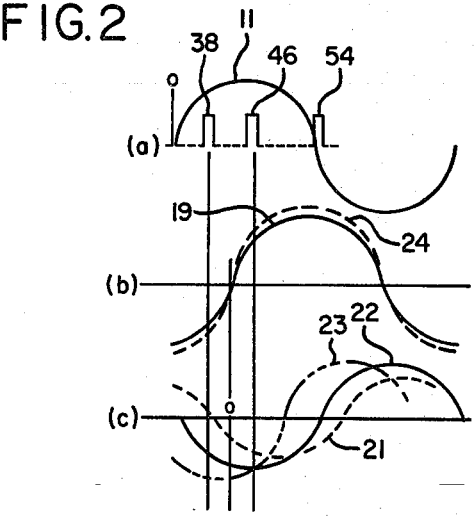
FIGS. 2(a)–(c) are waveforms representative of signals occurring in the apparatus shown by FIG. 1.

Referring to FIG. 1, the metal detector of the present invention operates generally in the following manner. An oscillator 10 produces a transmit electrical signal, illustrated by waveform 11 in FIG. 2(a), which is fed to a transmit coil 12 in a search head of the apparatus, thereby producing a varying magnetic field. The search head includes a receive coil 14 placed in close proximity to the transmit coil 12 and coupled thereto such that a receive signal is induced in the receive coil. The transmit coil preferably comprises two windings 16 and 18 connected in series and balanced with respect to the receive coil 14 such that, in the absence of any magnetic field-distorting material in proximity to the search head, the signal induced in the receive coil is minimized. An exemplary receive signal waveform 19 generated in the absence of any field-distorting material is shown in FIG. 2(b). The receive coil is connected to a preamplifier 20 for providing an adequate receive signal level for the rest of the circuitry.

When a field-distorting material comes in proximity to the search head, a new receive signal is produced which is comprised of components resulting from the field-distorting materials that are present. It has been found empirically that certain classes of materials have generally distinct phase characteristics relative to the transmit signal, and can be represented by specific, commonly-known objects. For example, a coin, particularly a copper coin such as a penny whose receive signal component waveform 21 is shown in FIG. 2(c), is representative of a particular class of conductive target objects that are often sought. An aluminum pull tab from a beverage container, whose receive signal component waveform 22 is also shown in FIG. 2(c), is representative of a class of objects that are conductive and difficult to distinguish from coins but generally unwanted. A bottle cap, whose receive signal waveform 23 is shown in FIG. 2(c), is representative of conductive, ferrous objects that are also frequently unwanted. In addition, distributed mineral materials, illustrated by the waveform 24 shown in FIG. 2(b), also have a characteristic relative phase which is typically close to the same as the receive signal absent any field-distorting material. Without intending to limit the applicability or concepts of the present invention, these examples will be utilized throughout this detailed description.

The output of the oscillator 10 is also fed to circuitry which samples the receive signal and produces a sense signal proportional to the receive signal absent any component from distributed mineral material. The sense signal is amplified by a sense amplifier 25 whose output modulates the output amplitude of an audio amplifier 26. An audio signal input to the audio amplifier is derived from an audio oscillator 27, so the audio amplifier produces an aural output whose amplitude is indicative of the proximity of a target object. The sense signal also drives a meter amplifier 28, connected to a meter 30 which provides a visual indication of the proximity of a target object.

Another signal produced by the sampling circuitry is fed to discriminate circuitry including a differential discriminate amplifier 32 the polarity of whose output indicates whether or not a target object is present. The output from the discriminate amplifier is a discriminate signal which is fed to a gate 34 that inhibits the input of the sense signal to the audio amplifier 26 and the meter amplifier 28 in the presence of a reject object and the absence of a target object, thereby cutting off the output of the detector apparatus. Thus, the only loss in sensitivity of the apparatus due to object discrimination results from elimination of the mineral component.

Turning now to more specific aspects of the exemplary embodiment of the present invention, the transmit signal produced by the oscillator 10 is fed to a comparator 35 which, by comparing the sinusoidal signal of the oscillator to a reference voltage, produces a series of pulses. The output of the comparator is fed to a first pulse generator 36 which produces a first gating pulse 38 of predetermined width, as shown in FIG. 2(a), which is fed to a sample hold circuit 40. Although there may be some variance in the actual adjustment of the timing of the gating pulse 38, it is ideally set to correspond to the moment when the component 21 of the receive signal attributable to the target object, i.e., a coin in this example, has zero amplitude and its phase angle is 180°, as shown in FIG. 2(c). Thus, the output "Z" from the sample hold circuit 40 excludes any component of the receive signal attributable to such a target object.

The output of the first pulse generator 36 is fed to a second pulse generator 44 which similarly produces a second gating pulse 46, also shown in FIG. 2(a), which is fed to a second sample hold circuit 48. Because of the characteristic phase relationships of the components of the receive signal attributable to mineralization and the exemplary target object, the first gating pulse 38 would occur while the phase angle of the component 24 attributable to mineralization is between 270° and 360°, i.e., in the fourth quadrant. The timing of the second gating pulse 46 is therefore adjusted such that it occurs when the phase angle of the mineralization component is between 0° and 90°, i.e., in the first quadrant, at a time interval after its zero crossing point equal to the time interval that the first pulse 38 occurs before the zero crossing point of the mineralization component. Consequently, the output "X" of the second sample hold circuit 48 includes a mirror component of the mineralization component in the output Z. In fact, the second pulse generator 44 is preferably made adjustable to achieve this condition for various mineral environments.

In practice, more effective detection of target objects may be obtained by adjustment of the first gating pulse 38 so that it occurs when the phase angle of the target component is between 90° and 180°, i.e., in the second quadrant, and the second gating pulse is also adjusted accordingly. Such an adjustment causes a slightly positive Z output for the target component and therefor tends to ensure a positive output from the discriminate amplifier 32 for a target object. Such an adjustment, however, is considered encompassed by the principles of this invention.

In addition, the output of the first pulse generator 36 is fed to a third pulse generator 52 which similarly produces a third gating pulse 54, shown in FIG. 2(a), which controls a third sample hold circuit 56. The timing of the pulse 54 is set such that it occurs when the component 22 of the receive signal attributable to a reject object 58, i.e., an aluminum pull tab in this example, is zero and its phase angle is 0°. Consequently, the output "Y" of sample hold circuit 56 includes no component attributable to that particular reject object.

While a particular arrangement of an oscillator and pulse generators is shown, it is recognized that other periodic signal generating and pulse generating circuits, respectively, could be utilized which would generate the same transmit signal and timing relationships between the gating pulses without departing from the principles of this invention.

Figure 3:
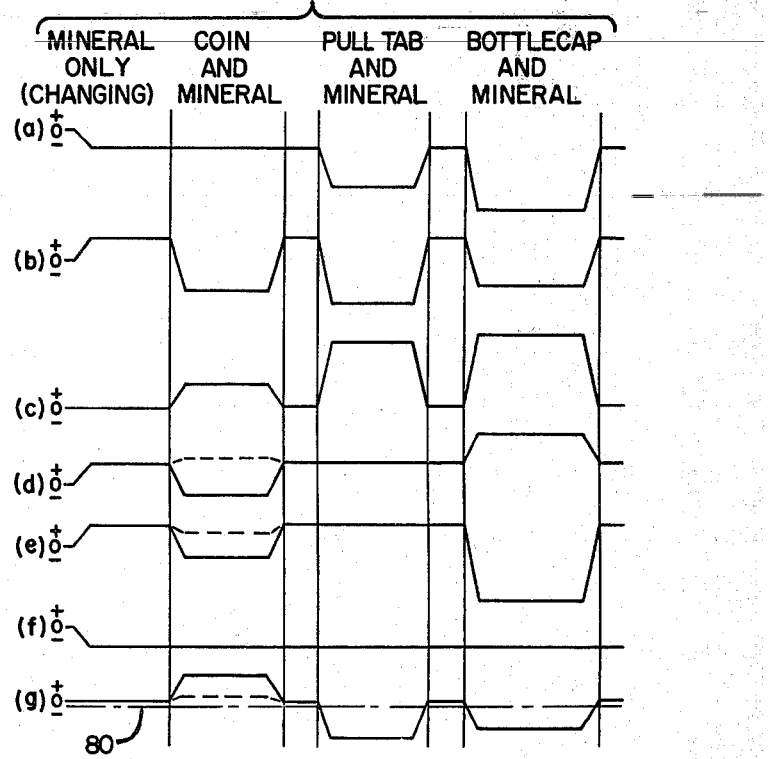
FIGS. 3(a)–(g) are additional waveforms representative of signals occurring in the apparatus shown in FIG. 1.

Referring now to FIG. 3 in particular, the outputs Z, FIG. 3(a) and X, FIG. 3(b), are added by a summing circuit 62, whereby the component attributable to mineralization cancels out, and fed to the sense amplifier 25 so that the sense amplifier will not produce an output in response to the presence of mineral material alone, but will produce an output in response to the proximity of a metallic object, as shown in FIG. 3(c). (In the exemplary case the sense amplifier inverts its input signal.)

In the discriminate circuit the output Z of the sample hold circuit 40 is also fed to a non-inverting input of the discriminate amplifier 32, while the output Y of sample hold circuit 56 is fed to an inverting input of the discriminate amplifier. If there were no mineral component in the receive signal the negative signal to the inverting input of the discriminate differential amplifier would produce a positive output which would maintain the gate 34 open, producing an audio indication of the presence of a target object, and add to the output from the sense amplifier 25 to produce an accentuated indication on the meter 30.

In fact, however, mineral conditions almost always exist, and must be compensated for by the discriminate circuit. To this end, the circuit is provided with an inverting correction amplifier 66, a gate/memory circuit 68, a summing circuit 70 and a comparator 72. Ordinarily the correction amplifier feeds back, through the gate/memory circuit 68 to the summing circuit 70, a sufficient inverted signal, shown in FIG. 3(f), from the output of the discriminate amplifier 32 to drive that output essentially to zero, as shown in FIG. 3(g) for the period during which only a mineral material is present.

When a coin, or any other conductive material comes within the proximity of the search head, a positive output is generated from the sense amplifier 25, as shown in FIG. 3(c), which causes the comparator 72 to interrupt the feedback by closing a gate of the gate/memory circuit 68 and actuating a memory therein such that the feedback signal to the discriminate amplifier 32 becomes fixed at the last value produced by ambient mineral conditions. Thus, until a metal object comes within the proximity of the search coil, no discriminate signal is generated.

Although no signal from a desired target object is ordinarily generated in the Z output, a negative going signal will be generated at the Y output by a target object, as shown in FIG. 3(d), which will cause the discriminate differential amplifier 32 to produce a positive output, as shown in FIG. 3(g). The positive discriminate signal permits the sense signal to pass through the gate 34, producing an audio indication of the presence of a target object, and adds to the sense signal to produce a positive meter response.

In contrast, when an aluminum pull tab comes into proximity of the search head, the Y output is unaffected, while the Z output becomes more negative, as shown in FIGS. 3(a) and (d). At the same time, the comparator 72 is actuated since the pull tab produces a positive output from the sense amplifier 25, thereby fixing the feedback to the discriminate amplifier 32. As a result, the discriminate amplifier will produce a negative output in response to the presence of a pull tab, which will inhibit any audio output from the metal detector.

Ordinarily, mineral effects remain about the same in the area of a target object. However, it sometimes occurs that after a target object has been detected, and the feedback to the discriminate amplifier has been fixed, the mineral component of the receive signal will change substantially such that the Y output becomes more positive than when the target object was first detected. In order to compensate for this condition, the discriminate circuit is provided with an absolute value amplifier 74, another gate/memory circuit 76, responsive to the comparator 72, and a scaling circuit 78 for adjusting the output amplitude of the absolute value amplifier 74. In the absence of a proximate metallic object, the absolute value amplifier simply has unity gain so that its output follows its input; however, in the presence of a proximate metallic object the comparator 72 actuates the gate/memory circuit 76 which fixes the reference level of the absolute value amplifier at its input just prior to the sensing of the metallic object. Thereafter, the absolute value has unity gain for all input signals to the extent that they are less than or equal to that reference level and has a gain of minus one for all input signals to the extent that they exceed that reference level.

Such a condition is illustrated by dotted lines in FIGS. 3(d), (e) and (g). In the aforementioned illustration, after the detector has sensed a target object, and the reference level of the absolute value amplifier 74 and the feedback signal to the discriminate amplifier 32 have therefore been fixed by the gate/memory circuits 76 and 68 respectively, the component of the receive signal attributable to mineralization has greatly increased to the point where the output Y is positive, rather than negative, with respect to the reference level of the absolute value amplifier, as shown in FIG. 3(d).

Since this would result in a negative output from the discriminate amplifier 32 which, if in excess of a minimum threshold level, would inhibit the detector audio output and in any case would tend to decrease the positive meter indication, the absolute value amplifier is provided to invert such a positive signal, as shown in FIG. 3(e), resulting in a positive output from the discriminate amplifier, as shown in FIG. 3(g).

It is possible that such a fluctuation in mineralization would be such that the output from the discriminate amplifier would be essentially zero, and that slight imbalances in the input to the discriminate differential amplifier would even cause its output to be slightly negative in the presence of a target object. Consequently, the threshold actuation level 80 of the gate 34, shown in FIG. 3(g), is set slightly below zero so that an output from the metal detector will not be inhibited under the aforementioned conditions.

The scaling circuit 78 is necessitated by the absolute value circuit and the need to discriminate against bottle caps and like reject objects. Referring to FIGS. 3(d) and (e), the output Y for such an item will be positive with respect to the mineral reference level and therefore be inverted by the absolute value amplifier. To avoid interpretation of such a relatively negative signal as a target item, the amplitude of the output of the absolute value amplifier is reduced by the scaling circuit in relation to the Z output such that the discriminate amplifier 32 will produce a negative output in the presence of such an item. The scaling circuit also reduces the amplitude of the positive signal resulting from mineral material, thereby facilitating balance of the input to the discriminate differential amplifier.

It is sometimes desirable to locate items other than those which are characterized by a coin. Rings and brass relics would be typical of items not represented by a coin. In order to accomplish such discrimination, the discriminate circuit is provided with a summing circuit 82 and an attenuator 84 for adding a selectable amount of the output of the sense amplifier 25 to the Z output for input to the discriminate differential amplifier 32. Since the sense amplifier inverts its input signal, a selected component of the receive signal attributable to a metallic object other than that for which the first gating pulse has been set, can be reduced to zero. For example, if it were desired to detect aluminum material, represented by a pull tab, a sufficient output from the sense amplifier would be added by the summing circuit 82 to the input of the discriminate amplifier to cause the net difference between the Y and Z inputs to be positive, thereby producing a positive discriminate signal at the output of the discriminate amplifier. At the same time, positive output from the sense amplifier attributable to the usual target object, represented by a coin, would also be added to the Z output, thereby causing the net output of the discriminate amplifier due to such an object to be more positive, and would therefore cause no loss of ability to detect objects represented by coins. While other examples could be given, the foregoing illustrates the function of this particular aspect of the apparatus.

Figure 4A:
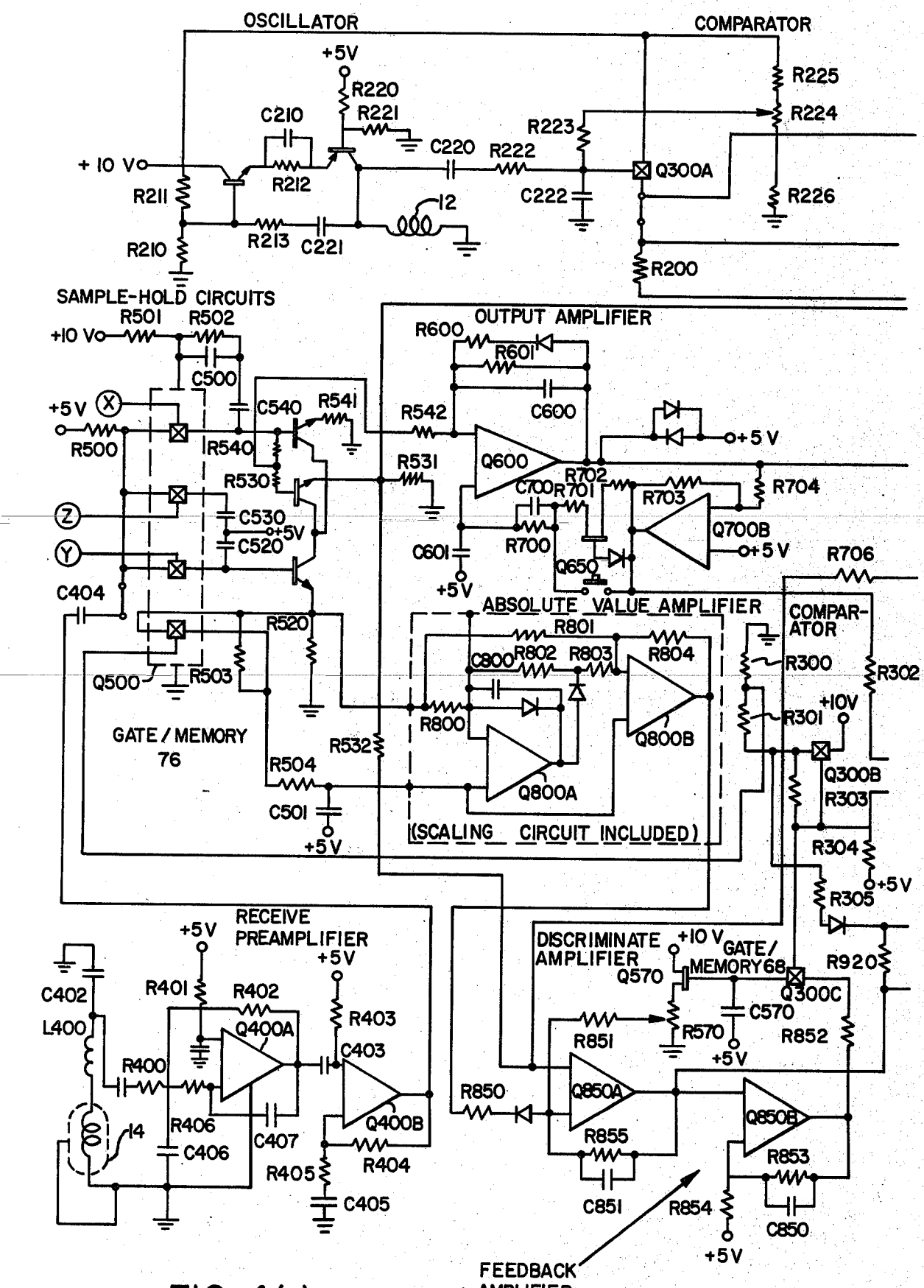
FIGS. 4(a) and (b) are, taken together, a schematic diagram of an exemplary circuit for implementing the apparatus shown in FIG. 1.
Figure 4B:
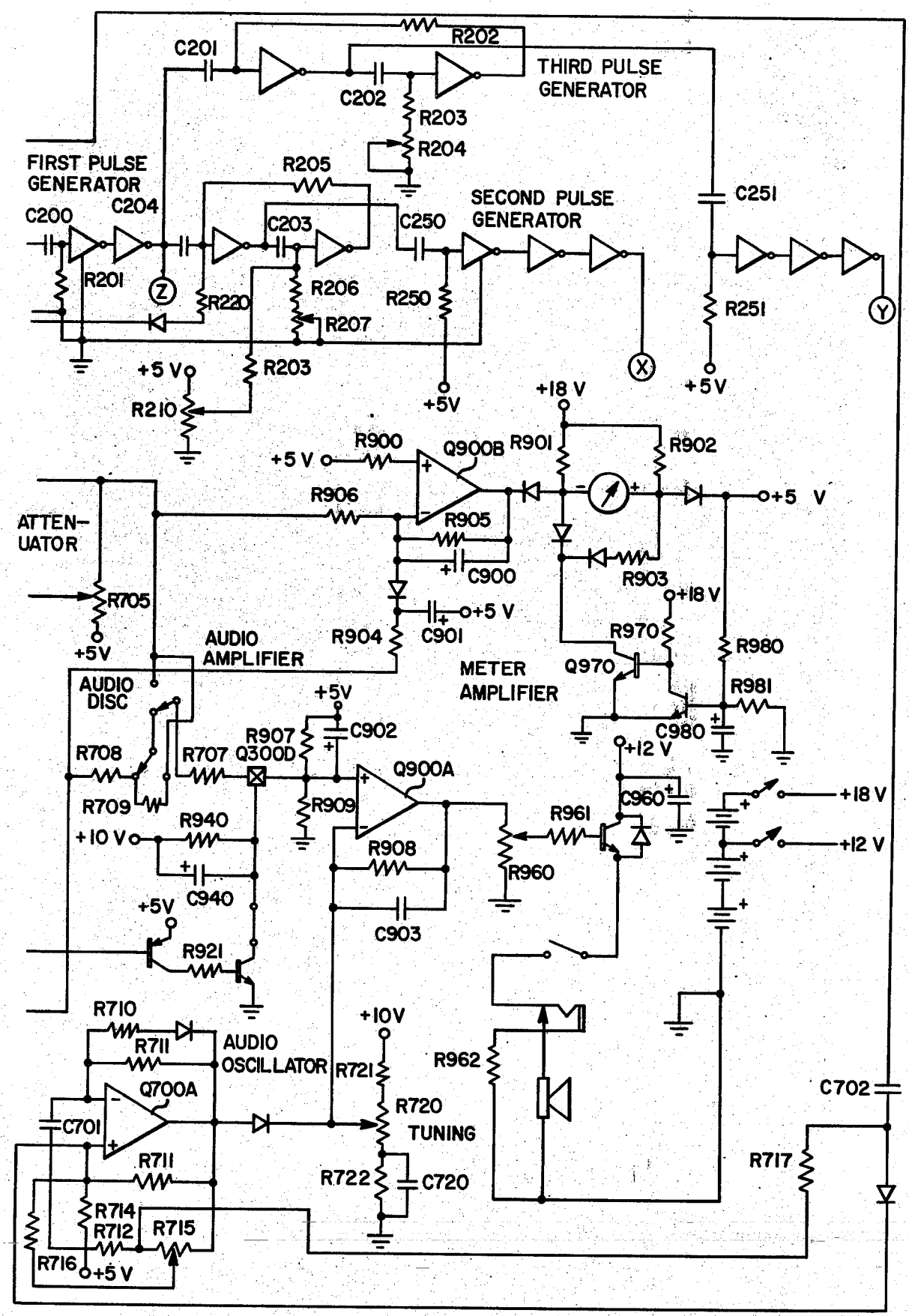

A specific schematic diagram for implementing the aforedescribed functions is shown in FIG. 4. In addition, the components in that schematic diagram are listed in Table 1 hereof where their values or identification may not be sufficiently clear from the schematic diagram. Nevertheless, it is recognized that the functions herein described could be implemented by various specific combinations of circuit components and, in disclosing the schematic diagram of this exemplary embodiment, no limitations of the concepts and implementing configurations of the present invention are intended.

TABLE 1

| Component | Description | Value/Type |
|---|---|---|
| R200 | Resistor | 100 K ohms |
| R201 | " | 56 K ohms |
| R202 | " | 100 K ohms |
| R203 | " | 56 K ohms |
| R204 | " | 100 K ohms |
| R205 | " | 180 K ohms |
| R206 | " | 56 K ohms |
| R207 | " | 100 K ohms |
| R210 | " | 10 K ohms |
| R211 | " | 51 K ohms |
| R212 | " | 1 K ohms |
| R213 | " | 30 K ohms |
| R220 | " | 5.6 K ohms |
| R221 | " | 20 K ohms |
| R222 | " | 20 K ohms |
| R223 | " | 20 K ohms |
| R224 | " | 25 K ohms |
| R225 | " | 20 K ohms |
| R226 | " | 20 K ohms |
| R250 | " | 82 K ohms |
| R251 | " | 100 K ohms |
| R300 | " | 150 K ohms |
| R301 | " | 30 K ohms |
| R302 | " | 6.8 K ohms |
| R303 | " | 56 K ohms |
| R304 | " | 30 K ohms |
| R305 | " | 100 K ohms |
| R400 | " | 30 K ohms |
| R401 | " | 56 K ohms |
| R402 | " | 150 K ohms |
| R403 | " | 100 K ohms |
| R404 | " | 20 K ohms |
| R405 | " | 5.6 K ohms |
| R406 | " | 30 K ohms |
| R500 | " | 5.6 K ohms |
| R501 | " | 10 K ohms |
| R502 | " | 20 K ohms |
| R503 | " | 20 K ohms |
| R504 | " | 10 K ohms |
| R520 | " | 10 K ohms |
| R530 | " | 56 K ohms |
| R531 | " | 36 K ohms |
| R532 | " | 5.6 K ohms |
| R540 | " | 30 K ohms |
| R541 | " | 30 K ohms |
| R542 | " | 82 K ohms |
| R570 | " | 25 K ohms |
| R600 | " | 1 K ohms |
| R601 | " | 10 K ohms |
| R700 | " | 220 K ohms |
| R701 | " | 47 K ohms |
| R702 | " | 100 K ohms |
| R703 | " | 220 K ohms |
| R704 | " | 10 K ohms |
| R705 | " | 10 K ohms |
| R706 | " | 39 K ohms |
| R707 | " | 3.3 K ohms |
| R708 | " | 15 K ohms |
| R709 | " | 22 K ohms |
| R710 | " | 30 K ohms |
| R711 | " | 150 K ohms |
| R712 | " | 5.6 K ohms |
| R714 | " | 180 K ohms |
| R715 | " | 100 K ohms |
| R716 | " | 68 K ohms |
| R717 | " | 1 K ohms |
| R720 | " | 10 K ohms |
| R721 | " | 30 K ohms |
| R722 | " | 30 K ohms |
| R800 | " | 20 K ohms |
| R801 | " | 20 K ohms |
| R802 | " | 20 K ohms |
| R803 | " | 10 K ohms |
| R804 | " | 15 K ohms |

TABLE 1-continued

| Component | Description | Value/Type |
|---|---|---|
| R850 | " | 6.8 K ohms |
| R851 | " | 3.3 K ohms |
| R852 | " | 470 K ohms |
| R853 | " | 220 K ohms |
| R854 | " | 10 K ohms |
| R855 | " | 2.2 K ohms |
| R900 | " | 100 K ohms |
| R901 | " | 10 K ohms |
| R902 | " | 10 K ohms |
| R903 | " | 820 K ohms |
| R904 | " | 39 K ohms |
| R905 | " | 100 K ohms |
| R906 | " | 100 K ohms |
| R907 | " | 10 K ohms |
| R908 | " | 3.3 K ohms |
| R909 | " | 2.2 K ohms |
| R920 | " | 20 K ohms |
| R921 | " | 68 K ohms |
| R940 | " | 68 K ohms |
| R960 | " | 10 K ohms |
| R961 | " | 10 K ohms |
| R962 | " | 100 K ohms |
| R970 | " | 100 K ohms |
| R980 | " | 82 K ohms |
| R981 | " | 20 K ohms |
| C200 | Capacitor | 100 p farads |
| C201 | " | 470 p farads |
| C202 | " | 470 p farads |
| C203 | " | 180 p farads |
| C204 | " | 180 p farads |
| C210 | " | 10 m farads |
| C220 | " | .047 m farads |
| C221 | " | .1 m farads |
| C222 | " | .001 m farads |
| C250 | " | 100 p farads |
| C251 | " | 100 p farads |
| C402 | " | 470 p farads |
| C403 | " | .022 m farads |
| C404 | " | .047 m farads |
| C405 | " | .022 m farads |
| C406 | " | 100 p farads |
| C407 | " | 27 p farads |
| C500 | " | 10 m farads |
| C501 | " | 10 m farads |
| C520 | " | .7 m farads |
| C530 | " | .01 m farads |
| C540 | " | .01 m farads |
| C570 | " | 100 m farads |
| C600 | " | 3300 p farads |
| C601 | " | 100 m farads |
| C700 | " | .01 m farads |
| C701 | " | .01 m farads |
| C702 | " | 100 p farads |
| C720 | " | 220 p farads |
| C800 | " | .0047 m farads |
| C850 | " | 1 m farads |
| C851 | " | .0047 m farads |
| C900 | " | 1 m farads |
| C901 | " | 10 m farads |
| C902 | " | 10 m farads |
| C903 | " | 220 p farads |
| C940 | " | 1 p farads |
| C960 | " | 100 m farads |
| C980 | " | 100 m farads |
| Q300A | Analog Switch | ¼ 4066 |
| Q300B | " | ¼ 4066 |
| Q300C | " | ¼ 4066 |
| Q300D | " | ¼ 4066 |
| Q400A | Operational Amplifier | ½ 1458 |
| Q400B | Operational Amplifier | ½ 1458 |
| Q500 | Analog Switch | 4066 |
| Q570 | FET | 5457 |
| Q600 | Operational Amplifier | 355 |
| Q650 | FET | 2N4338 |
| Q700A | Operational Amplifier | ½ 358 |
| Q700B | Operational Amplifier | ½ 358 |

TABLE 1-continued

| Component | Description | Value/Type |
|---|---|---|
| Q800A | Operational Amplifier | ½ 1458 |
| Q800B | Operational Amplifier | ½ 1458 |
| Q850A | Operational Amplifier | ½ 358 |
| Q850B | Operational Amplifier | ½ 358 |
| Q900A | Operational Amplifier | ½ 358 |
| Q900B | Operational Amplifier | ½ 358 |
| Q970 | Operational Amplifier | 5172 |

K = kilo (1000)
m = micro ($10^{-6}$)
p = pico ($10^{-12}$)

In operation, the search coils of the detector system are placed over the ground to be searched and the timing of the second gating pulse 46 is adjusted to nullify any audio output from distributed mineral materials. The phase relationship of the mineral component to the transmit signal can vary over a fairly well-established, small range, hence the need for that adjustment. The attenuator 84 is set to eliminate any feedback from the sense amplifier 22 to the summing circuit 82 and the ground area may then be searched for audio and meter indications of the proximity of a target item while items represented by bottle caps and pull tabs are rejected. As long as the search coils are in proximity to the target item an output will be obtained from the detector, regardless of motion of the search head with respect to the target item. If some other metallic object is to be found, an exemplary object may be placed in the proximity of the search head and the attenuator 84 adjusted for optimum output from the detector. Thereafter a search for such items may be made in similar manner to target items represented by a coin.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A metal detector apparatus, comprising:
   (a) a signal source circuit for producing a periodic transmit signal;
   (b) a transmit coil, connected to said signal source circuit, for producing a changing magnetic field in response to said transmit signal;
   (c) a receive coil, magnetically coupled to said transmit coil, for producing a receive signal in response to the proximity of material which distorts said magnetic field;
   (d) first sampling means, synchronized with said transmit signal, for producing a first sample signal representative of the amplitude of said receive signal at a first predetermined phase relationship with said transmit signal;
   (e) second sampling means, synchronized with said transmit signal, for producing a second sample signal representative of the amplitude of said receive signal at a second predetermined phase relationship with said transmit signal;
   (f) discriminate amplifier means, having a first input connected to said first sampling means, and a second input connected to said second sampling means, and an output, for producing a discriminate signal representative of the proximity of a field-distorting material, said discriminate signal being proportional to the difference in amplitude between signals applied to said first and second inputs;
   (g) feedback means, connected to said output of said discriminate amplifier means, for applying a correction signal to a selected input of said discriminate amplifier and thereby maintaining said discriminate signal at a predetermined amplitude; and
   (h) interrupt means, connected to said feedback means and said selected input of said discriminate amplifier, and responsive to said receive signal, for fixing said correction signal in response to the proximity of a metallic material, such that said discriminate signal may vary in a predetermined relationship with the difference in amplitude between said first and second sample signals.

2. The metal detector apparatus of claim 1, further comprising third sampling means, synchronized with said transmit signal, for producing a third sample signal representative of the amplitude of said receive signal at a third predetermined relationship with said transmit signal; a first summing circuit, connected to said first and third sampling means, for producing a sense signal proportional to the sum of said first and third sample signals, said first and third predetermined phase relationships being selected such that any component of said receive signal attributable to the proximity of mineral material is substantially cancelled from said sense signal by said summing means, said interrupt means being responsive to said sense signal.

3. The metal detector apparatus of claim 2 wherein said feedback means comprises an inverting amplifier connected to the output of said discriminate amplifier means, and said interrupt means comprises a gate/memory circuit connected to said inverting amplifier and to a noninverting input of said discriminate amplifier means, said gate/memory circuit passing the output of said inverting amplifier in an "on" state and holding the last output of the inverting amplifier in an "off" state, and comparator means, connected to said first summing circuit, for turning said gate/memory circuit "on" in the absence of a sense signal representative of the proximity of a metallic material and "off" in the presence of such a sense signal.

4. The apparatus of claim 2, further comprising weighting means for varying the amplitude of said first sample signal before it is applied to said discriminate amplifier means, said weighting means including an attenuator connected to the output of said first summing circuit and a second summing circuit, connected between said first sampling means and said discriminate amplifier means and to the output of said attenuator, for subtracting a selected amount of said sense signal from said first sample signal for input to said differential amplifier means.

5. The apparatus of claim 1 further comprising sense circuit means, responsive to said receive signal, for producing a sense signal representative of the proximity of a metallic material, and gating means connected to the output of said discriminate amplifier means, for preventing the passage of said sense signal in response to a discriminate signal representative of the proximity of selected types of metallic material absent the proximity of a target metallic material, said discriminate signal being representative of the type of metallic material.

6. The apparatus of claim 5 wherein said sense circuit means comprises third sampling means, synchronized with said transmit signal, for producing a third sample signal representative of the amplitude of said receive signal at a third predetermined phase relationship with said transmit signal; summing means, connected to said first and third sampling means, for adding said first and third sample signals, said first and third predetermined phase relationships being selected such that any component of said receive signal attributable to the proximity of mineral material is cancelled from said sense signal by said summing means, the output of said summing means being representative of the proximity of metallic materials.

7. The apparatus of claim 5 further comprising indicator means, connected to said sense circuit means, for indicating the amplitude of said sense signal.

8. The apparatus of claim 5 further comprising sound generator means, connected to said gating means, for generating a sound when said sense signal is passed by said gating means, the volume of said sound being representative of the amplitude of said sense signal.

9. The apparatus of claim 1 further comprising absolute value amplifier means, connected between said second sampling means and an input of said discriminate amplifier means, for producing a signal representative of the absolute value of said second sample signal relative to a reference signal amplitude, said absolute value amplifier including a reference signal input; gate/memory means, connected to said second sampling means, said reference signal input, and said interrupt means, for applying said second sample signal to said reference input and fixing said reference signal input in response to the proximity of metallic materials, such that the output of said absolute value amplifier means is referenced thereto; and scaling means associated with said absolute value amplifier means for adjusting the output amplitude of said absolute value amplifier means to said discriminate amplifier means to achieve a desired discriminate signal response to the proximity of a target metallic material.

10. A metal detector apparatus, comprising:

(a) a signal source circuit for producing a periodic transmit signal;

(b) a transmit coil, connected to said signal source circuit, for producing a changing magnetic filed in response to said transmit signal;

(c) a receive coil, magnetically coupled to said transmit coil, for producing a receive signal in response to the proximity of material which distorts said magnetic field;

(d) first sampling means, synchronized with said transmit signal, for producing a first sample signal representative of the amplitude of said receive signal at a first predetermined phase relationship with said transmit signal;

(e) second sampling means, synchronized with said transmit signal, for producing a second sample signal representative of the amplitude of said receive signal at a second predetermined phase relationship with said transmit signal;

(f) differential amplifier means, having a first input connected to said first sampling means, and a second input connected to said second sampling means, and an output, for producing a discriminate signal representative of the proximity and type of a field-distorting material, said discriminate signal being proportional to the difference in amplitude between signals applied to said first and second inputs;

(g) third sampling means, synchronized with said transmit signal, for producing a third sample signal representative of the amplitude of said receive signal at a third predetermined relationship with said transmit signal;

(h) summing means, connected to said first and third sampling means, for adding said first and third sample signals, said first and third predetermined phase relationships being selected such that any component of said receive signal attributable to the proximity of a mineral material is cancelled by said summing means, said summing means producing a sense signal representative of the proximity of metallic materials; and (i) gating means, connected to said summing means and responsive to said discriminate signal, for preventing said sense signal from passing therethrough when said discriminate signal indicates the presence of predetermined types of metallic materials absent the presence of a target metallic material.

* * * * *